(12) United States Patent
Yan et al.

(10) Patent No.: US 10,230,902 B2
(45) Date of Patent: Mar. 12, 2019

(54) METHODS AND DEVICES FOR CORRECTING VIDEO FLICKER (71) Applicant: BOE Technology Group Co., Ltd., Beijing (CN)

(72) Inventors: Han Yan, Beijing (CN); Pablo Navarrete Michelini, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/560,094

(22) PCT Filed: Mar. 22, 2017

(86) PCT No.: PCT/CN2017/077651
§ 371 (c)(1),
(2) Date: Sep. 20, 2017

(87) PCT Pub. No.: WO2017/202122
PCT Pub. Date: Nov. 30, 2017

(65) Prior Publication Data
US 2018/0191939 A1 Jul. 5, 2018

(30) Foreign Application Priority Data

May 27, 2016 (CN) .......................... 2016 1 0366051

(51) Int. Cl.
*G06T 5/40* (2006.01)
*G06T 5/50* (2006.01)
(Continued)

(52) U.S. Cl.
CPC ............. *H04N 5/2357* (2013.01); *G06T 5/40* (2013.01); *G06T 5/50* (2013.01); *H04N 5/20* (2013.01); *H04N 5/2351* (2013.01); *H04N 9/68* (2013.01)

(58) Field of Classification Search
CPC ....... H04N 5/2357; H04N 5/2351; H04N 9/68
See application file for complete search history.

(56) References Cited

U.S. PATENT DOCUMENTS 6,507,668 B1 1/2003 Park
8,964,124 B2 2/2015 Fujine et al.
(Continued)

FOREIGN PATENT DOCUMENTS

CN 1260663 A 7/2000
CN 1750043 * 3/2006 ............... G06T 5/40
(Continued)

OTHER PUBLICATIONS

International Search Report and Written Opinion, including English translations of International Search Report and Box V of the Written Opinion, for International Application No. PCT/CN2017/077651, dated Mar. 22, 2017, 25 pages.
(Continued)

*Primary Examiner* — Gevell V Selby
(74) *Attorney, Agent, or Firm* — Westman, Champlin & Koehler, P.A.

(57) ABSTRACT

The present disclosure provides a method and device for correcting video flicker. The method comprises: performing statistics on grayscale values of a previous frame of video image to obtain a histogram of the grayscale values of the previous frame of video image; determining correction weights for correcting grayscale values of a next frame of video image according to the histogram; and correcting the grayscale values of the next frame of video image according to the correction weights.

16 Claims, 9 Drawing Sheets

(51) Int. Cl.
*H04N 5/20* (2006.01)
*H04N 9/68* (2006.01)
*H04N 5/235* (2006.01)

(56) References Cited

U.S. PATENT DOCUMENTS

| | | |
|---|---|---|
| 2005/0031200 A1 | 2/2005 | Lee et al. |
| 2009/0009623 A1* | 1/2009 | Hoshino ............... H04N 5/235 348/222.1 |
| 2009/0066632 A1 | 3/2009 | Chen |
| 2009/0195697 A1* | 8/2009 | Kanumuri ............ G06F 17/145 348/607 |
| 2010/0214478 A1* | 8/2010 | Miyazawa .............. G06T 5/002 348/553 |
| 2011/0085734 A1* | 4/2011 | Berg ................ G06F 17/30802 382/195 |

FOREIGN PATENT DOCUMENTS

| | | |
|---|---|---|
| CN | 1750043 A | 3/2006 |
| CN | 101179650 A | 5/2008 |
| CN | 101388183 A | 3/2009 |
| CN | 103930943 A | 7/2014 |
| CN | 106028014 A | 10/2016 |

OTHER PUBLICATIONS

Wang et al. "Fast Image/Video Contrast Enhancement Based on Weighted Thresholded Histogram Equalization", IEEE Transactions on Consumer Electronics, vol. 53, No. 2, May 2007, 8 pages.

* cited by examiner

METHODS AND DEVICES FOR CORRECTING VIDEO FLICKER

CROSS-REFERENCE TO RELATED APPLICATION(S)

This application is a National Stage Application of PCT Application No. PCT/CN2017/077651, filed on Mar. 22, 2017, which claims priority to the Chinese Patent Application No. 201610366051.5, filed on May 27, 2016, which is incorporated herein by reference in its entirety.

TECHNICAL FIELD

The present disclosure relates to the field of image processing technology, and more particularly, to a method and device for correcting video flicker.

BACKGROUND

At present, a method for processing each frame of image primarily comprises performing the following operations in a blank time period between two adjacent frames of video image. Firstly, statistics is performed on grayscale values of a previous frame of video image, to obtain a histogram of the previous frame of video image; then a mapping table is obtained through the grayscale values of the previous frame of video image using an image contrast enhancement algorithm; and finally, grayscale mapping is performed on a next frame of video image according to the mapping table to obtain a processed next frame of video image. It can be known from the above processing method that current processing of a video image is merely limited to the processing using characteristics of the previous frame of image. However, if there is a significant difference between grayscale ranges of two adjacent frames, a video which is processed using the above method may result in an obvious flicker phenomenon in the process of playing the video.

However, the current method for processing an image in a video is determined according to a method for processing a still image, but does not take a problem of an effect of the processed video image in the process of playing a video into account, which results in a flicker phenomenon in the process of playing the processed video image.

In summary, if there is a significant difference between ranges of grayscale values of two adjacent frames of video image, there is a flicker phenomenon in the process of playing a video which is processed by the related technology.

SUMMARY

A method for correcting video flicker according to an embodiment of the present disclosure comprises:

performing statistics on grayscale values of a previous frame of video image to obtain a histogram of the grayscale values of the previous frame of video image;

determining correction weights for correcting grayscale values of a next frame of video image according to the histogram; and correcting the grayscale values of the next frame of video image according to the correction weights.

In an embodiment, correcting the grayscale values of the next frame of video image according to the correction weights comprises:

processing the grayscale values of the previous frame of video image using a contrast enhancement algorithm to obtain a mapping table for mapping the grayscale values of the next frame of video image;

determining mapped grayscale values of the next frame of video image according to the grayscale values of the next frame of video image and the mapping table; and determining final grayscale values of the next frame of video image according to the grayscale values of the next frame of video image, the mapped grayscale values of the next frame of video image and the correction weights.

In an embodiment, determining correction weights for correcting grayscale values of a next frame of video image according to the histogram comprises:

determining a first correction parameter for representing a size of a distribution range of the grayscale values of the previous frame of video image according to the histogram; and determining the correction weights for correcting the grayscale values of the next frame of video image according to the first correction parameter.

In an embodiment, the correction weights for correcting grayscale values of a next frame of video image comprise: a first correction weight for determining a proportion of the mapped grayscale values of the next frame of video image and a second correction weight for determining a proportion of the grayscale values of the next frame of video image;

determining the correction weights for correcting the grayscale values of the next frame of video image according to the first correction parameter comprises:

determining the first correction weight for determining the proportion of the mapped grayscale values of the next frame of video image according to the first correction parameter; and determining the second correction weight for determining the proportion of the grayscale values of the next frame of video image according to the first correction weight; and determining final grayscale values of the next frame of video image according to the grayscale values of the next frame of video image, the mapped grayscale values of the next frame of video image and the correction weights comprises:

determining the final grayscale values of the next frame of video image according to the grayscale values of the next frame of video image, the mapped grayscale values of the next frame of video image, the first correction weight and the second correction weight.

In an embodiment, determining the final grayscale values of the next frame of video image according to the grayscale values of the next frame of video image, the mapped grayscale values of the next frame of video image, the first correction weight and the second correction weight comprises:

determining the grayscale values of the next frame of video image by performing weighted averaging on the mapped grayscale values of the next frame of video image and the grayscale values of the next frame of video image using the first correction weight and the second correction weight, to obtain the final grayscale values of the next frame of video image.

In an embodiment, determining the first correction weight for determining a proportion of the mapped grayscale values of the next frame of video image according to the first correction parameter comprises:

determining that the first correction weight is 0 if the first correction parameter is less than a first preset threshold;

determining that the first correction weight is 1 if the first correction parameter is greater than or equal to a second preset threshold, wherein the first preset threshold is less than the second preset threshold;

otherwise, determining the first correction weight according to the first correction parameter, the first preset threshold, and the second preset threshold.

In an embodiment, determining the first correction weight for determining a proportion of the mapped grayscale values of the next frame of video image according to the first correction parameter comprises:

determining the first correction weight for determining the proportion of the mapped grayscale values of the next frame of video image according to the first correction parameter and a preset second correction parameter.

In an embodiment, determining the first correction weight for determining the proportion of the mapped grayscale values of the next frame of video image according to the first correction parameter and a preset second correction parameter comprises:

determining that the first correction weight is 0 if the first correction parameter is less than a first preset threshold;

determining that the first correction weight is the preset second correction parameter if the first correction parameter is greater than or equal to a second preset threshold, wherein the first preset threshold is less than the second preset threshold;

otherwise, determining that the first correction weight is in a positive correlation relationship with the preset second correction parameter.

In an embodiment, the positive correlation relationship is a linear relationship.

A device for correcting video flicker according to an embodiment of the present disclosure comprises:

a histogram statistics unit configured to perform statistics on grayscale values of a previous frame of video image to obtain a histogram of the grayscale values of the previous frame of video image;

a weight determination unit configured to determine correction weights for correcting grayscale values of a next frame of video image according to the histogram; and an image correction unit configured to correct the grayscale values of the next frame of video image according to the correction weights.

In an embodiment, the image correction unit is further configured to:

process the grayscale values of the previous frame of video image using a contrast enhancement algorithm to obtain a mapping table for mapping the grayscale values of the next frame of video image;

determine mapped grayscale values of the next frame of video image according to the grayscale values of the next frame of video image and the mapping table; and determine final grayscale values of the next frame of video image according to the grayscale values of the next frame of video image, the mapped grayscale values of the next frame of video image and the correction weights.

In an embodiment, the weight determination unit is further configured to:

determine a first correction parameter for representing a size of a distribution range of the grayscale values of the previous frame of video image according to the histogram; and determine the correction weights for correcting the grayscale values of the next frame of video image according to the first correction parameter.

In an embodiment, the correction weights for correcting grayscale values of a next frame of video image comprise:
a first correction weight for determining a proportion of the mapped grayscale values of the next frame of video image and a second correction weight for correcting a proportion of the grayscale values of the next frame of video image;

the weight determination unit is further configured to determine the correction weights for correcting the grayscale values of the next frame of video image according to the first correction parameter by:

determining the first correction weight for determining the proportion of the mapped grayscale values of the next frame of video image according to the first correction parameter; and determining the second correction weight for correcting the proportion of the grayscale values of the next frame of video image according to the first correction weight; and the image correction unit is further configured to determine the final grayscale values of the next frame of video image according to the grayscale values of the next frame of video image, the mapped grayscale values of the next frame of video image and the correction weights by:

determining the final grayscale values of the next frame of video image according to the grayscale values of the next frame of video image, the mapped grayscale values of the next frame of video image, the first correction weight and the second correction weight.

In an embodiment, the image correction unit is further configured to determining the final grayscale values of the next frame of video image according to the grayscale values of the next frame of video image, the mapped grayscale values of the next frame of video image, the first correction weight and the second correction weight by:

determining the final grayscale values of the next frame of video image by performing weighted averaging on the mapped grayscale values of the next frame of video image and the grayscale values of the next frame of video image using the first correction weight and the second correction weight.

In an embodiment, the weight determination unit is further configured to determine the first correction weight for determining the proportion of the mapped grayscale values of the next frame of video image according to the first correction parameter by:

determining that the first correction weight is 0 if the first correction parameter is less than a first preset threshold;

determining that the first correction weight is 1 if the first correction parameter is greater than or equal to a second preset threshold, wherein the first preset threshold is less than the second preset threshold;

otherwise, determining the first correction weight according to the first correction parameter, the first preset threshold, and the second preset threshold.

In an embodiment, the weight determination unit is further configured to determine the first correction weight for determining the proportion of the mapped grayscale values of the next frame of video image according to the first correction parameter by:

determining the first correction weight for determining the proportion of the mapped grayscale values of the next frame of video image according to the first correction parameter and a preset second correction parameter.

In an embodiment, the weight determination unit is further configured to determine the first correction weight for determining the proportion of the mapped grayscale values of the next frame of video image according to the first correction parameter and a preset second correction parameter by:

determining that the first correction weight is 0 if the first correction parameter is less than a first preset threshold;

determining that the first correction weight is the preset second correction parameter if the first correction parameter is greater than or equal to a second preset threshold, wherein the first preset threshold is less than the second preset threshold;

otherwise, determine that the first correction weight is in a positive correlation relationship with the preset second correction parameter.

In an embodiment, the positive correlation relationship is a linear relationship.

DETAILED DESCRIPTION

The embodiments of the present disclosure provide a method and device for correcting video flicker, which determines correction weights for correcting grayscale values of a next frame of video image through a histogram of grayscale values of a previous frame of video image, thereby alleviating the flicker problem in the process of playing the processed video image which is caused by directly processing the next frame of video frame according to the previous frame of video image in the related technology and improving the fluency of the play of the video image.

The technical solutions of the present disclosure will be described clearly and completely below in conjunction with the accompanying drawings in the embodiments of the present disclosure, and it will be apparent that the described embodiments are a part of the embodiments of the present disclosure instead of all the embodiments. All other embodiments obtained by those of ordinary skill in the art based on the embodiments of the present disclosure without contributing any creative work are within the protection scope of this application.

Figure 1:
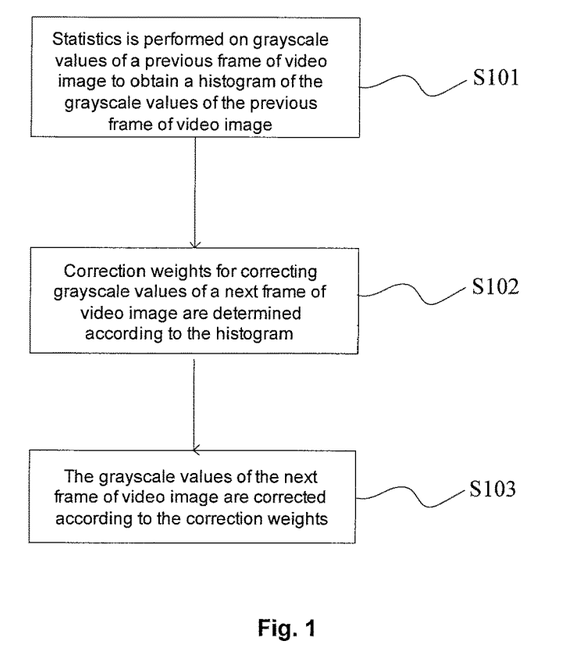
FIG. 1 is a flowchart of a method for correcting video flicker according to an embodiment of the present disclosure.

As shown in FIG. 1, the embodiments of the present disclosure provide a method for correcting video flicker, which may comprise the following steps.

In S101, statistics is performed on grayscale values of a previous frame of video image to obtain a histogram of the grayscale values of the previous frame of video image.

In S102, correction weights for correcting grayscale values of a next frame of video image are determined according to the histogram.

In S103, the grayscale values of the next frame of video image are corrected according to the correction weights.

Figure 2A:
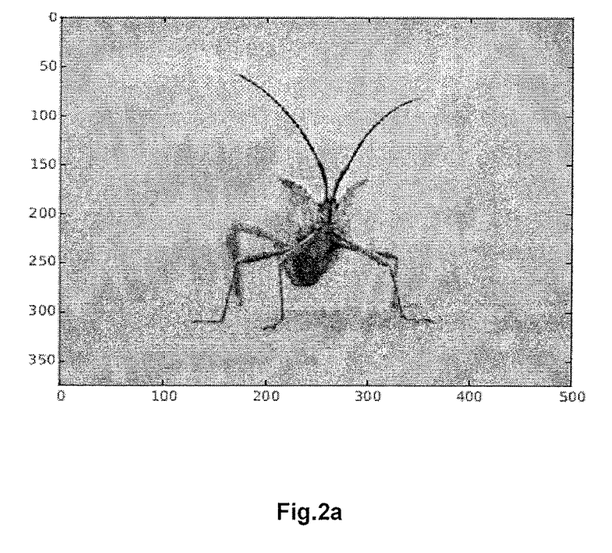
FIG. 2a is a diagram of a previous frame of video image according to an embodiment of the present disclosure.
Figure 2B:
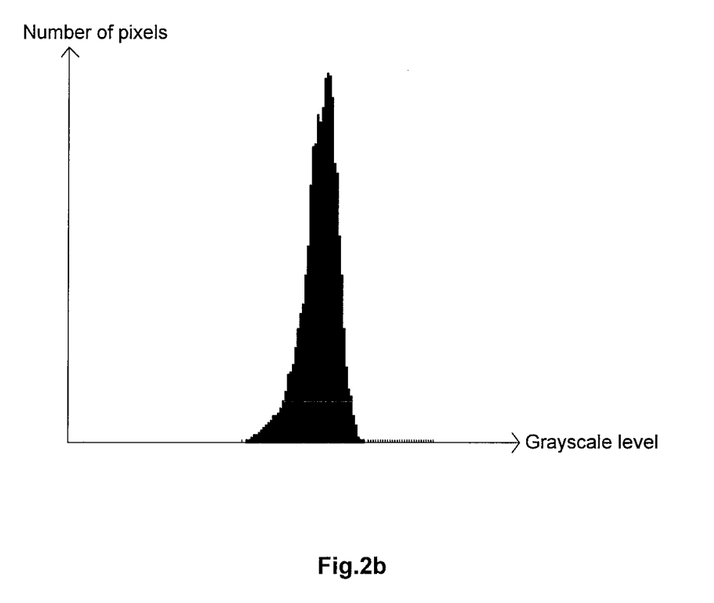
FIG. 2b is a histogram of a distribution of grayscale values of a previous frame of video image according to an embodiment of the present disclosure.

In the histogram of the grayscale values of the previous frame of video image in step S101, the horizontal coordinate axis indicates a grayscale level, and the vertical coordinate axis indicates the number of pixels. For example, FIG. 2a is the previous frame of video image, and FIG. 2b is a histogram of a distribution of grayscale values of pixels in FIG. 2a.

In the embodiments of the present disclosure, the correction weights for correcting the grayscale values of the next frame of video image are determined through the histogram of the grayscale values of the previous frame of video image, and the grayscale values of the next frame of video image are corrected according to the correction weights, which alleviates the flicker problem in the process of playing the processed video image which is caused by directly processing the next frame of video frame according to the previous frame of video image in the related technology and improves the fluency of the play of the video image.

Figure 3:
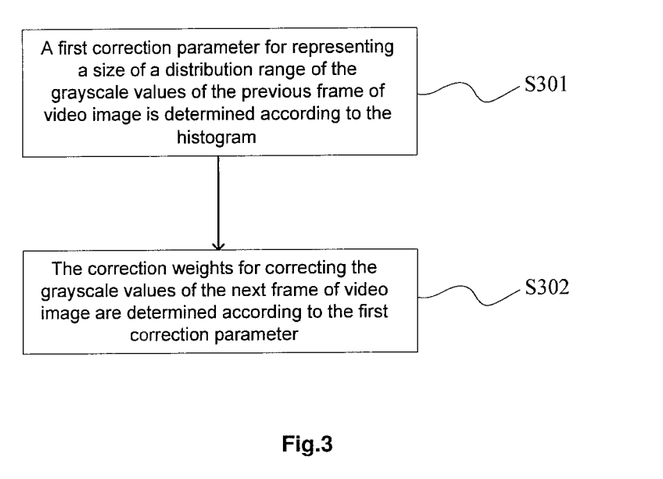
FIG. 3 is a flowchart of a method for determining correction weights according to an embodiment of the present disclosure.

As shown in FIG. 3, the method for determining the correction weights in step S102 specifically comprises the following steps.

In S301, a first correction parameter for representing a size of a distribution range of the grayscale values of the previous frame of video image is determined according to the histogram.

In S302, the correction weights for correcting the grayscale values of the next frame of video image are determined according to the first correction parameter.

The first correction parameter in step S301 may be a variance of the grayscale values of the previous of frame of video image.

Figure 4:
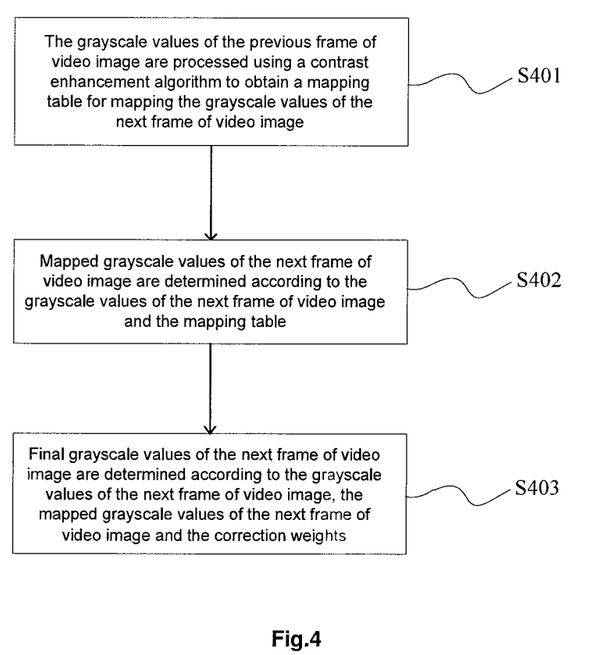
FIG. 4 is a flowchart of a method for correcting a video image according to an embodiment of the present disclosure.

As shown in FIG. 4, the method for correcting the grayscale values of the next frame of video image in step S103 specifically comprises the following steps.

In S401, the grayscale values of the previous frame of video image are processed using a contrast enhancement algorithm to obtain a mapping table for mapping the grayscale values of the next frame of video image.

In S402, mapped grayscale values of the next frame of video image are determined according to the grayscale values of the next frame of video image and the mapping table.

In S403, final grayscale values of the next frame of video image are determined according to the grayscale values of the next frame of video image, the mapped grayscale values of the next frame of video image and the correction weights.

The contrast enhancement algorithm described in step S401 may be an equalization algorithm by which the grayscale values of the previous frame of video image are processed to obtain a mapping relationship between the processed grayscale values of the previous frame of video image and the unprocessed grayscale values of the previous frame of video image, so as to determine a mapping table for mapping the grayscale values of the next frame of video image.

In the embodiments of the present disclosure, the correction weights are determined according to the size of the distribution range of the grayscale values of the previous frame of video image, which avoids the flicker problem in the process of playing the video which is processed by the related technology when there is a significant difference between grayscale ranges of two adjacent frames and improves the fluency of the play of the video image.

Figure 5:
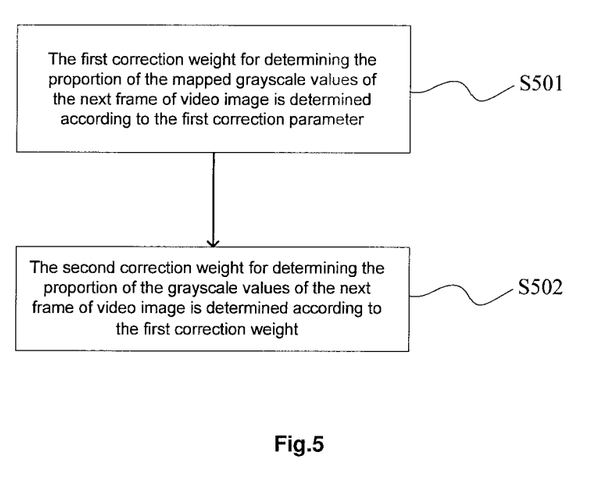
FIG. 5 is a flowchart of a method for determining correction weights according to an embodiment of the present disclosure.

As the correction weights for correcting the grayscale values of the next frame of video image comprise: a first correction weight for determining a proportion of the mapped grayscale values of the next frame of video image and a second correction weight for determining a proportion of the grayscale values of the next frame of video image, as shown in FIG. 5, step S302 specifically comprises the following steps.

In S501, the first correction weight for determining the proportion of the mapped grayscale values of the next frame of video image is determined according to the first correction parameter.

In S502, the second correction weight for determining the proportion of the grayscale values of the next frame of video image is determined according to the first correction weight.

In this case, step S403 specifically comprises:

determining the final grayscale values of the next frame of video image by performing weighted averaging on the mapped grayscale values of the next frame of video image and the grayscale values of the next frame of video image using the first correction weight and the second correction weight.

In step S403, the mapped grayscale values of the next frame of video image are corrected using the first correction weight, the grayscale values of the next frame of video image are corrected using the second correction weight, and a summation process is performed on the corrected mapped grayscale values of the next frame of video image and the corrected grayscale values of the next frame of video image to obtain the final grayscale values of the next frame of video image.

Specifically, in the embodiments of the present disclosure, the grayscale values of the video image can be adjusted by a user according to his/her own requirements by adding a preset second correction parameter, so as to achieve a correction effect of correcting the video image according to different requirements. Therefore, the second correction parameter may be a correction weight input by the user, wherein the correction weight is a percentage; or the second correction parameter may also be a ratio of the correction parameter input by the user to a maximum correction parameter which can be input by the user, wherein the correction parameter input by the user is any positive integer between 1 and n, where n is a maximum parameter of parameters input by the user and is a positive integer.

If the second correction parameter is not preset, step S501 specifically comprises:

determining that the first correction weight is 0 if the first correction parameter is less than a first preset threshold;

determining that the first correction weight is 1 if the first correction parameter is greater than or equal to a second preset threshold, wherein the first preset threshold is less than the second preset threshold;

otherwise, determining the first correction weight according to the first correction parameter, the first preset threshold, and the second preset threshold.

If the second correction parameter is preset, step S501 specifically comprises:

determining that the first correction weight is 0 if the first correction parameter is less than a first preset threshold;

determining that the first correction weight is the preset second correction parameter if the first correction parameter is greater than or equal to a second preset threshold, wherein the first preset threshold is less than the second preset threshold;

otherwise, determining that the first correction weight is in a positive correlation relationship with the preset second correction parameter.

The positive correlation relationship is a linear relationship.

In the embodiments of the present disclosure, when the first correction parameter is less than the first preset threshold, the grayscale range of the previous frame of video image is small, and if the next frame of video image is processed using the previous frame of video image in the related technology, a flicker problem occurs in the process of playing the processed video image. Therefore, the correction weights for correcting the grayscale values of the next frame of video image are set to zero to avoid an excessive enhancement process for the next frame of video image and improve the flicker problem. Further, in order to ensure the fluency of the play of the processed image, when the first correction parameter is no less than the first preset threshold and the first correction parameter is greater than the second preset threshold, a positive correlation relationship between the correction weights for correcting the grayscale values of the next frame of video image and the preset second correction parameter is determined.

In order to better understand the method for correcting video flicker according to the embodiments of the present disclosure, the method will be further explained below with reference to FIGS. 6-9 in combination with equations 1-8.

Figure 6:
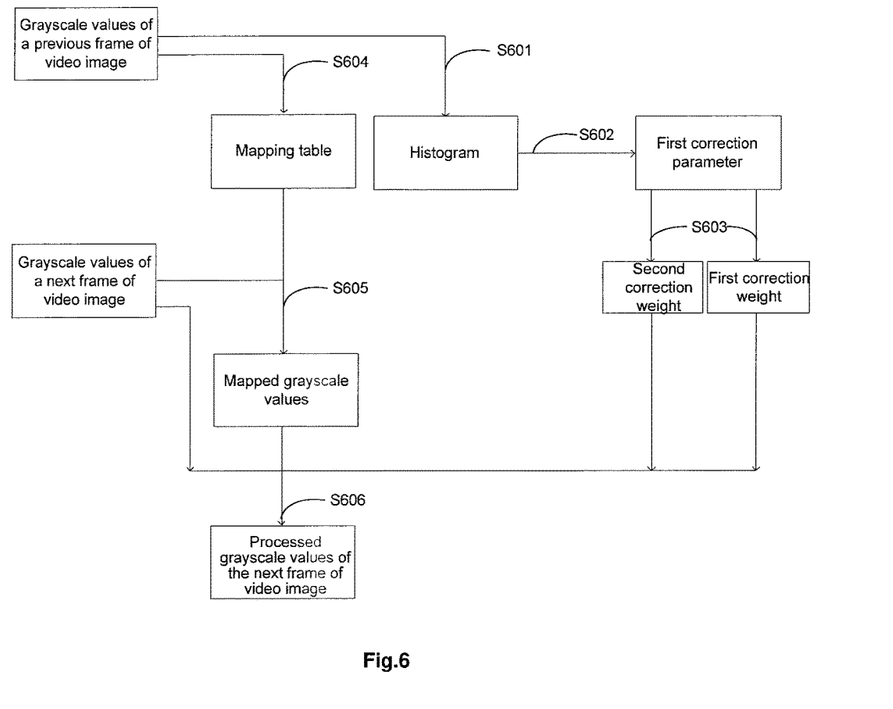
FIG. 6 is a flowchart of a method for correcting video flicker according to an embodiment of the present disclosure.

With reference to the following steps in the flow of FIG. 6, in S601, statistics is performed on grayscale values of pixels in a previous frame of video image to obtain a histogram of the grayscale values of the previous frame of video image, wherein the obtained histogram comprises a grayscale value $r_k$ of a pixel in the previous frame of video image and the number $h(r_k)$ of pixels corresponding to the grayscale value, where k is a grayscale level.

In S602, a first correction parameter, that is, a variance $\sigma^2$, for representing a size of a distribution range of the grayscale values of the previous frame of video image is determined according to the histogram using equation 1, equation 2 and equation 3;

$$S1 = \sum h(r_k) \cdot r_k \qquad \text{Equation 1}$$

$$S2 = \sum h(r_k) \cdot r_k \cdot r_k \qquad \text{Equation 2}$$

$$\sigma^2 = \frac{S2}{R} - \left(\frac{S1}{R}\right)^2 \qquad \text{Equation 3}$$

where S1 and S2 are intermediate quantities, $r_k$ is a grayscale value of a pixel in the previous frame of video image, $h(r_k)$ is the number of pixels corresponding to the grayscale value, $\sigma^2$ is a variance, and R is the number of pixels in the video image.

In S603, a first correction weight $IT_1$ for determining a proportion of the mapped grayscale values of the next frame of video image is determined according to the determined first correction parameter, i.e., the variance $\sigma^2$, a first preset threshold P4, and a second preset threshold P5 using a preset judgment method; and a second correction weight $IT_2$ for determining a proportion of the grayscale values of the next frame of video image is determined according to the first correction weight $IT_1$.

Specifically, the preset judgment method comprises:

if the variance $\sigma^2$ is less than the first preset threshold P4, determining that the first correction weight is $IT_1=0$, and the second correction weight is $IT_2=1$;

if the variance $\sigma^2$ is greater than or equal to the first preset threshold P4 and less than the second preset threshold P5, determining that the first correction weight is $$IT_1 = \frac{(\sigma^2 - P4)}{(P5 - P4)},$$

and the second correction weight is $$IT_2 = 1 - \frac{(\sigma^2 - P4)}{(P5 - P4)};$$

and if the variance $\sigma^2$ is greater than or equal to the second preset threshold P5, determining that the first correction weight $IT_1$ is 1, and the second correction weight $IT_2$ is 0.

In S604, the grayscale values of the previous frame of video image are processed using a contrast enhancement algorithm to obtain a mapping table for mapping the grayscale values of the next frame of video image.

In S605, the grayscale values $l_k$ of the next frame of video image are mapped using the mapping table in step S604 to obtain the mapped grayscale values of the next frame of video image, i.e., the mapped gray scale values $t_k$ of the next frame of video image, where k is a grayscale level.

In S606, final grayscale values $T_k$ of the next frame of video image are obtained according to the grayscale values $l_k$ of the next frame of video image, the mapped grayscale values $t_k$ of the next frame of video image, the first correction weight $IT_1$ and the second correction weight $IT_2$ using an equation 4, where k is a grayscale level:

$$T_k = IT_1 \cdot t_k + IT_2 \cdot l_k \qquad \text{Equation 4}$$

where $T_k$ is a final grayscale value of the next frame of video image; $IT_1$ is the first corrected weight; $t_k$ is a mapped grayscale value of the next frame of video image; $IT_2$ is the second correction weight; and $l_k$ is a grayscale value of the next frame of video image.

Figure 7:
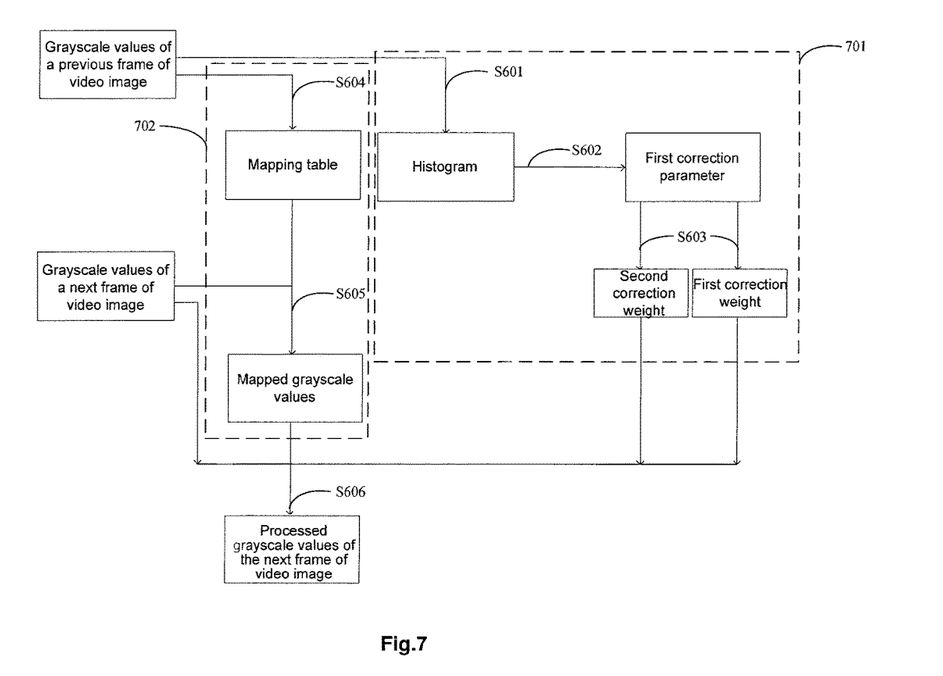
FIG. 7 is a flowchart of a method for correcting video flicker according to an embodiment of the present disclosure.

Specifically, as shown in FIG. 7, steps S601 to S603 are a part of determining the first correction weight and the second correction weight, that is, a correction determination part 701; and steps S604 and S605 are a part of determining the mapped grayscale values of the next frame of video image, that is, a mapped grayscale value determination part 702; wherein the correction determination part 701 and the mapped grayscale value determination part 702 do not need to satisfy a particular sequential order.

Figure 8:
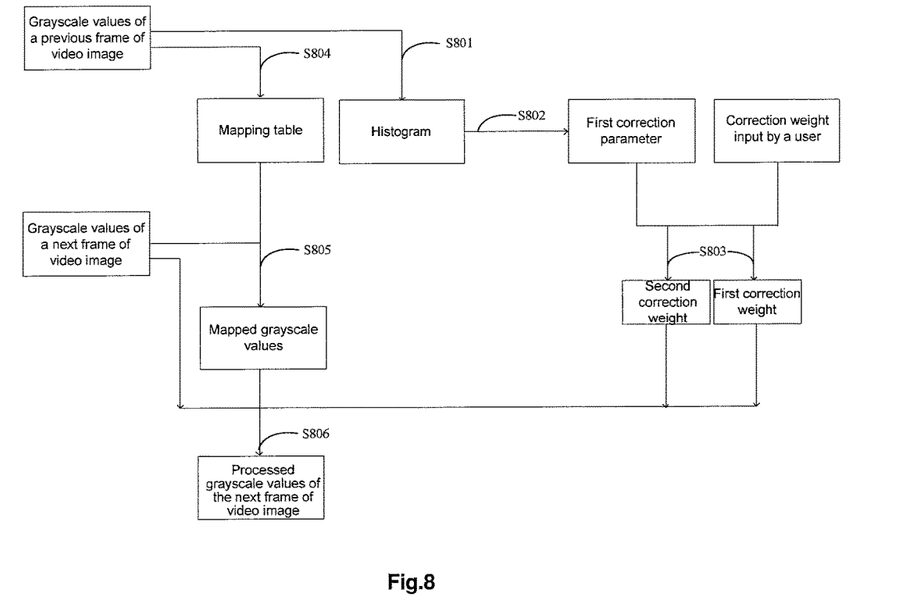
FIG. 8 is a flowchart of a method for correcting video flicker according to an embodiment of the present disclosure.

With reference to the following steps in the flow of FIG. 8, in S801, statistics is performed on grayscale values of pixels in a previous frame of video image to obtain a histogram of the grayscale values of the previous frame of video image, wherein the obtained histogram comprises a grayscale value $r_k$ of a pixel in the previous frame of video image and the number $h(r_k)$ of pixels corresponding to the grayscale value, where k is a grayscale level.

In S802, a first correction parameter, that is, a variance $\sigma^2$, for representing a size of a distribution range of the grayscale values of the previous frame of video image is determined according to the histogram using equation 5, equation 6 and equation 7;

$$S1 = \sum h(r_k) \cdot r_k \qquad \text{Equation 5}$$

$$S2 = \sum h(r_k) \cdot r_k \cdot r_k \qquad \text{Equation 6}$$

$$\sigma^2 = \frac{S2}{R} - \left(\frac{S1}{R}\right)^2 \qquad \text{Equation 7}$$

where S1 and S2 are intermediate quantities, $r_k$ is a grayscale value of a pixel in the previous frame of video image, $h(r_k)$ is the number of pixels corresponding to the grayscale value, $\sigma^2$ is a variance, and R is the number of pixels in the video image.

In S803, a first correction weight $IT_1$ for determining a proportion of the mapped grayscale values of the next frame of video image is determined according to the determined first correction parameter, i.e., the variance $\sigma^2$, a correction weight CT input by a user, a first preset threshold P4, and a second preset threshold P5 using a preset judgment method; and a second correction weight $IT_2$ for determining a proportion of the grayscale values of the next frame of video image is determined according to the first correction weight $IT_1$, wherein the correction weight CT input by the user is a percentage.

If a parameter input by the user is a correction parameter CT', the correction weight is $$CT = \frac{CT'}{n},$$

where CT' is any positive integer between 1 and n, and n is a maximum parameter of parameters input by the user and is a positive integer.

Specifically, the preset judgment method comprises:

if the variance $\sigma^2$ is less than the first preset threshold P4, determining that the first correction weight is $IT_1=0$, and the second correction weight is $IT_2=1$;

if the variance $\sigma^{-2}$ is greater than or equal to the first preset threshold P4 and less than the second preset threshold P5, determining that the first correction weight is $$IT_1 = \frac{(\sigma^2 - P4)}{(P5 - P4)} \cdot CT,$$

and the second correction weight is $$IT_2 = 1 - \frac{(\sigma^2 - P4)}{(P5 - P4)} \cdot CT;$$

and if the variance $\sigma^2$ is greater than or equal to the second preset threshold P5, determining that the first correction weight is $IT_1=CT$, and the second correction weight is $IT_2=1-CT$.

In S804, the grayscale values of the pixels in the previous frame of video image are processed using a contrast enhancement algorithm to obtain a mapping relationship between the processed grayscale values of the previous frame of video image and the unprocessed grayscale values of the previous frame of video image, so as to determine a mapping table for mapping the grayscale values of the next frame of video image.

In S805, the grayscale values $l_k$ of the next frame of video image are mapped using the mapping table in step S804 to obtain the mapped grayscale values of the next frame of video image, i.e., the mapped gray scale values $t_k$ of the next frame of video image, where k is a grayscale level.

In S806, final grayscale values $T_k$ of the next frame of video image are obtained according to the grayscale values $l_k$ of the next frame of video image, the mapped grayscale values $t_k$ of the next frame of video image, the first correction weight $IT_1$ and the second correction weight $IT_2$ using an equation 8, where k is a grayscale level:

$$T_k = IT_1 \cdot t_k + IT_2 \cdot l_k \qquad \text{Equation 8}$$

where $T_k$ is a final grayscale value of the next frame of video image; $IT_1$ is the first corrected weight; $t_k$ is a mapped grayscale value of the next frame of video image; $IT_2$ is the second correction weight; and $l_k$ is a grayscale value of the next frame of video image.

Figure 9:
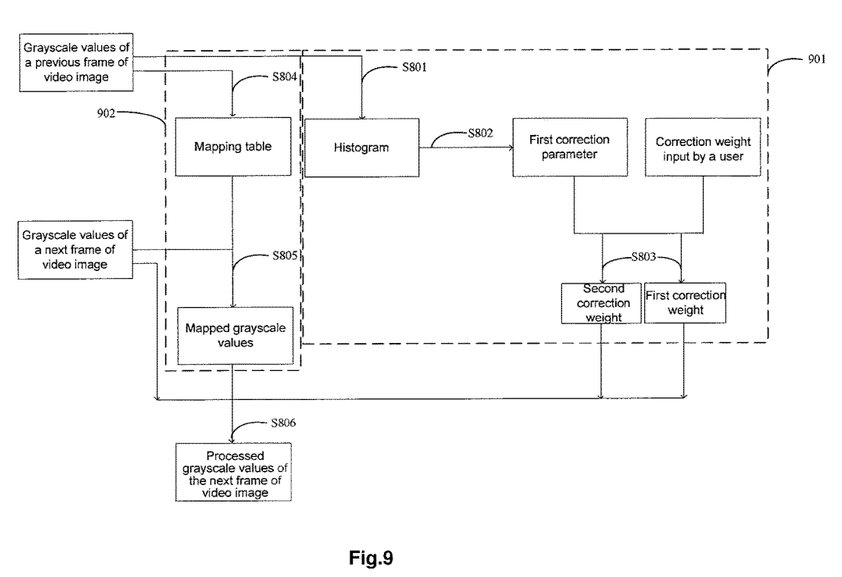
FIG. 9 is a flowchart of a method for correcting video flicker according to an embodiment of the present disclosure.

Specifically, as shown in FIG. 9, steps S801 to S803 are a part of determining the first correction weight and the second correction weight, that is, a correction determination part 901; and steps S804 and S805 are a part of determining the mapped grayscale values of the next frame of video image, that is, a mapped grayscale value determination part 902; wherein the correction determination part 901 and the mapped grayscale value determination part 902 do not need to satisfy a particular sequential order.

In order to coherently understand the process of processing the entire video, assuming that the previous frame of video image is a first frame of video image, and the next frame of video image is a second frame of video image, the method for correcting video flicker according to the embodiments of the present disclosure is performed in a first blank period during which the first frame of video image has been played completely and the second frame of video image has not been played. That is, grayscale values of the processed second frame of video image are obtained according to original grayscale values of the first frame of video image and original grayscale values of the second frame of video image. After the first blank period ends, the processed second frame of video image is played. When the processed second frame of video image has been played completely and a third frame of video image has not been played, i.e., during a second blank period, grayscale values of the processed third frame of video image are obtained according to the original grayscale values of the second frame of video image and original grayscale values of the third frame of video image. After the second blank period ends, the processed third frame of video image is played, and so on, until the video has been played completely.

Figure 10:
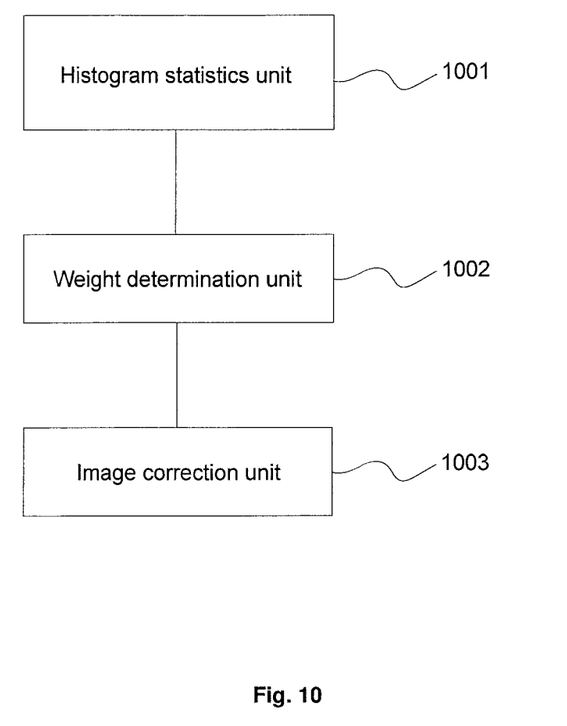
FIG. 10 is a structural diagram of a device for correcting video flicker according to an embodiment of the present disclosure.

As shown in FIG. 10, the embodiments of the present disclosure provide a device for correcting video flicker, comprising:

a histogram statistics unit 1001 configured to perform statistics on grayscale values of a previous frame of video image to obtain a histogram of the grayscale values of the previous frame of video image;

a weight determination unit 1002 configured to determine correction weights for correcting grayscale values of a next frame of video image according to the histogram; and an image correction unit 1003 configured to correct the grayscale values of the next frame of video image according to the correction weights.

In the embodiments of the present disclosure, the correction weights for correcting the grayscale values of the next frame of video image are determined through the histogram of the grayscale values of the previous frame of video image, which alleviates the flicker problem in the process of playing the processed video image which is caused by directly processing the next frame of video frame according to the previous frame of video image in the related technology and improves the fluency of the play of the video image.

In an embodiment, the image correction unit 1003 is further configured to:

process the grayscale values of the previous frame of video image using a contrast enhancement algorithm to obtain a mapping table for mapping the grayscale values of the next frame of video image;

determine mapped grayscale values of the next frame of video image according to the grayscale values of the next frame of video image and the mapping table; and determine final grayscale values of the next frame of video image according to the grayscale values of the next frame of video image, the mapped grayscale values of the next frame of video image and the correction weights.

In an embodiment, the weight determination unit 1002 is further configured to:

determine a first correction parameter for representing a size of a distribution range of the grayscale values of the previous frame of video image according to the histogram; and determine the correction weights for correcting the grayscale values of the next frame of video image according to the first correction parameter.

In the embodiments of the present disclosure, the correction weights are determined according to the size of the distribution range of the grayscale values of the previous frame of video image, which avoids the flicker problem in the process of playing the video which is processed by the related technology when there is a significant difference between grayscale ranges of two adjacent frames and improves the fluency of the play of the video image.

In an embodiment, the correction weights for correcting grayscale values of a next frame of video image comprise: a first correction weight for determining a proportion of the mapped grayscale values of the next frame of video image and a second correction weight for correcting a proportion of the grayscale values of the next frame of video image.

The weight determination unit 1002 is further configured to:

determine the first correction weight for determining the proportion of the mapped grayscale values of the next frame of video image according to the first correction parameter; and determine the second correction weight for correcting the proportion of the grayscale values of the next frame of video image according to the first correction weight.

The image correction unit 1003 is further configured to:

determine the final grayscale values of the next frame of video image according to the grayscale values of the next frame of video image, the mapped grayscale values of the next frame of video image, the first correction weight and the second correction weight.

In an embodiment, the image correction unit 1003 is further configured to:

determine the final grayscale values of the next frame of video image by performing weighted averaging on the mapped grayscale values of the next frame of video image and the grayscale values of the next frame of video image using the first correction weight and the second correction weight.

In an embodiment, the weight determination unit 1002 is further configured to:

determine that the first correction weight is 0 if the first correction parameter is less than a first preset threshold;

determine that the first correction weight is 1 if the first correction parameter is greater than or equal to a second preset threshold, wherein the first preset threshold is less than the second preset threshold;

otherwise, determine the first correction weight according to the first correction parameter, the first preset threshold, and the second preset threshold.

In an embodiment, the weight determination unit 1002 is further configured to:

determine the first correction weight for determining the proportion of the mapped grayscale values of the next frame of video image according to the first correction parameter and a preset second correction parameter.

In the embodiments of the present disclosure, a second correction parameter is preset to achieve a correction effect of correcting the video image according to different requirements.

In an embodiment, the weight determination unit 1002 is further configured to:

determine that the first correction weight is 0 if the first correction parameter is less than a first preset threshold;

determine that the first correction weight is the preset second correction parameter if the first correction parameter is greater than or equal to a second preset threshold, wherein the first preset threshold is less than the second preset threshold;

otherwise, determine that the first correction weight is in a positive correlation relationship with the preset second correction parameter.

In an embodiment, the positive correlation relationship is a linear relationship.

In the embodiments of the present disclosure, when the first correction parameter is less than the first preset threshold, the grayscale range of the previous frame of video image is small, and if the next frame of video image is processed using the previous frame of video image as in the related technology, a flicker problem occurs in the process of playing the processed video image. Therefore, the correction weights for correcting the grayscale values of the next frame of video image are set to zero to avoid an excessive enhancement process for the next frame of video image and improve the flicker problem. Further, in order to ensure the fluency of the play of the processed image, when the first correction parameter is no less than the first preset threshold and the first correction parameter is greater than the second preset threshold, a positive correlation relationship between the correction weights for correcting the grayscale values of the next frame of video image and the preset second correction parameter is determined.

In summary, the embodiments of the present disclosure provide a method and device for correcting video flicker, which determine correction weights for correcting grayscale values of a next frame of video image through a histogram of grayscale values of a previous frame of video image, so that the embodiments of the present disclosure can adaptively correct the next frame of video image using the correction weights without using an external memory (for example, Double Data RateSynchronous Dynamic Random (DDR SDRAM)), thereby alleviating the flicker problem in the process of playing the video image which is processed by the related technology and improving the fluency of the play of the video image.

It will be appreciated by those skilled in the art that embodiments of the present disclosure can be provided as methods, systems, or computer program products. Accordingly, the present disclosure may take a form of a pure hardware embodiment, a pure software embodiment, or a combination of software and hardware aspects. Moreover, the present disclosure may take a form of a computer program product implemented on one or more computer usable storage media (including but not limited to a disk memory and an optical memory, etc.) in which computer usable program codes are included.

The present disclosure is described with reference to the flowcharts and/or block diagrams of the methods, devices (systems) and computer program products according to the embodiments of the present disclosure. It should be understood that each flow and/or block in the flowcharts and/or block diagrams as well as a combination of the flows and/or blocks in the flowcharts and/or block diagrams can be implemented by computer program instructions. These computer program instructions can be provided to a processor of a general-purpose computer, a dedicated-purpose computer, an embedded processor, or other programmable data processing devices to generate a machine. Thereby, the instructions executed by the processor of the computer or other programmable data processing devices generate means for implementing functions specified in one or more flows in the flowcharts and/or one or more blocks in the block diagrams.

These computer program instructions can also be stored in a computer readable memory capable of introducing a computer or other programmable data processing devices to operate in a particular mode. Thereby, the instructions stored in the computer readable memory generate an article of manufacture comprising instruction means for implementing functions specified in one or more flows in the flowcharts and/or one or more blocks in the block diagrams.

These computer program instructions can also be loaded onto a computer or other programmable data processing devices, so as to enable a series of operation steps to be performed on the computer or other programmable devices to generate a computer-implemented process. Thereby, the instructions executed on the computer or other programmable devices provide a step of implementing functions specified in one or more flows in the flowcharts and/or one or more blocks in the block diagrams.

It will be apparent to those skilled in the art that various changes and variations can be made to the present disclosure without departing from the spirit and scope of the present disclosure. Thus, the present disclosure is intended to embrace such changes and variations if these changes and variations of the present disclosure are within the scope of the appended claims of the present disclosure and the equivalents thereof.

We claim:

1. A method for correcting video flicker, comprising:
performing statistics on grayscale values of a previous frame of video image to obtain a histogram of the grayscale values of the previous frame of video image;
determining correction weights for correcting grayscale values of a next frame of video image according to the histogram; and correcting the grayscale values of the next frame of video image according to the correction weights,
wherein correcting the grayscale values of the next frame of video image according to the correction weights comprises:
processing the grayscale values of the previous frame of video image using a contrast enhancement algorithm to obtain a mapping table for mapping the grayscale values of the next frame of video image;
determining mapped grayscale values of the next frame of video image according to the grayscale values of the next frame of video image and the mapping table; and
determining final grayscale values of the next frame of video image according to the grayscale values of the next frame of video image, the mapped grayscale values of the next frame of video image and the correction weights.

2. The method according to claim 1, wherein determining correction weights for correcting grayscale values of a next frame of video image according to the histogram comprises:
determining a first correction parameter for representing a size of a distribution range of the grayscale values of the previous frame of video image according to the histogram; and
determining the correction weights for correcting the grayscale values of the next frame of video image according to the first correction parameter.

3. The method according to claim 2, wherein the correction weights for correcting grayscale values of a next frame of video image comprise: a first correction weight for determining a proportion of the mapped grayscale values of the next frame of video image and a second correction weight for correcting a proportion of the grayscale values of the next frame of video image;
determining the correction weights for correcting the grayscale values of the next frame of video image according to the first correction parameter comprises:
determining the first correction weight for determining the proportion of the mapped grayscale values of the next frame of video image according to the first correction parameter; and
determining the second correction weight for correcting the proportion of the grayscale values of the next frame of video image according to the first correction weight; and
determining final grayscale values of the next frame of video image according to the grayscale values of the next frame of video image, the mapped grayscale values of the next frame of video image and the correction weights comprises:
determining the final grayscale values of the next frame of video image according to the grayscale values of the next frame of video image, the mapped grayscale values of the next frame of video image, the first correction weight and the second correction weight.

4. The method according to claim 3, wherein determining the final grayscale values of the next frame of video image according to the grayscale values of the next frame of video image, the mapped grayscale values of the next frame of video image, the first correction weight and the second correction weight comprises:
determining the final grayscale values of the next frame of video image by performing weighted averaging on the mapped grayscale values of the next frame of video image and the grayscale values of the next frame of video image using the first correction weight and the second correction weight.

5. The method according to claim 3, wherein determining the first correction weight for determining a proportion of the mapped grayscale values of the next frame of video image according to the first correction parameter comprises:
determining that the first correction weight is 0 if the first correction parameter is less than a first preset threshold;
determining that the first correction weight is 1 if the first correction parameter is greater than or equal to a second preset threshold, wherein the first preset threshold is less than the second preset threshold;
otherwise, determining the first correction weight according to the first correction parameter, the first preset threshold, and the second preset threshold.

6. The method according to claim 3, wherein determining the first correction weight for determining a proportion of the mapped grayscale values of the next frame of video image according to the first correction parameter comprises:
determining the first correction weight for determining the proportion of the mapped grayscale values of the next frame of video image according to the first correction parameter and a preset second correction parameter.

7. The method according to claim 6, wherein determining the first correction weight for determining the proportion of the mapped grayscale values of the next frame of video image according to the first correction parameter and a preset second correction parameter comprises:
determining that the first correction weight is 0 if the first correction parameter is less than a first preset threshold;
determining that the first correction weight is the preset second correction parameter if the first correction parameter is greater than or equal to a second preset threshold, wherein the first preset threshold is less than the second preset threshold;
otherwise, determining that the first correction weight is in a positive correlation relationship with the preset second correction parameter.

8. The method according to claim 7, wherein the positive correlation relationship is a linear relationship.

9. A device for correcting video flicker, comprising:
a histogram statistics unit configured to perform statistics on grayscale values of a previous frame of video image to obtain a histogram of the grayscale values of the previous frame of video image;
a weight determination unit configured to determine correction weights for correcting grayscale values of a next frame of video image according to the histogram; and
an image correction unit configured to correct the grayscale values of the next frame of video image according to the correction weights,
wherein the image correction unit is configured to:
process the grayscale: values of the previous frame of video image using a contrast enhancement algorithm to obtain a mapping table for mapping the grayscale values of the next frame of video image;
determine mapped grayscale values of the next frame of video image according to the grayscale values if the next frame of video image and the mapping table; and
determine final grayscale values of the next frame of video image according to the grayscale values of the next frame of video image, the mapped grayscale values of the next frame of video image and the correction weights.

10. The device according to claim 9, wherein the weight determination unit is configured to:

determine a first correction parameter for representing a size of a distribution range of the grayscale values of the previous frame of video image according to the histogram; and determine the correction weights for correcting the grayscale values of the next frame of video image according to the first correction parameter.

11. The device according to claim 10, wherein the correction weights for correcting grayscale values of a next frame of video image comprise: a first correction weight for determining a proportion of the mapped grayscale values of the next frame of video image and a second correction weight for correcting a proportion of the grayscale values of the next frame of video image;

the weight determination unit is further configured to:

determine the first correction weight for determining the proportion of the mapped grayscale values of the next frame of video image according to the first correction parameter; and determine the second correction weight for correcting the proportion of the grayscale values of the next frame of video image according to the first correction weight; and the image correction unit is further configured to:

determine the final grayscale values of the next frame of video image according to the grayscale values of the next frame of video image, the mapped grayscale values of the next frame of video image, the first correction weight and the second correction weight.

12. The device according to claim 11, wherein the image correction unit is further configured to:

determine the final grayscale values of the next frame of video image by performing weighted averaging on the mapped grayscale values of the next frame of video image and the grayscale values of the next frame of video image using the first correction weight and the second correction weight.

13. The device according to claim 11, wherein the weight determination unit is further configured to:

determine that the first correction weight is 0 if the first correction parameter is less than a first preset threshold;

determine that the first correction weight is 1 if the first correction parameter is greater than or equal to a second preset threshold, wherein the first preset threshold is less than the second preset threshold;

otherwise, determine the first correction weight according to the first correction parameter, the first preset threshold, and the second preset threshold.

14. The device according to claim 11, wherein the weight determination unit is further configured to:

determine the first correction weight for determining the proportion of the mapped grayscale values of the next frame of video image according to the first correction parameter and a preset second correction parameter.

15. The device according to claim 14, wherein the weight determination unit is further configured to:

determine that the first correction weight is 0 if the first correction parameter is less than a first preset threshold;

determine that the first correction weight is the preset second correction parameter if the first correction parameter is greater than or equal to a second preset threshold, wherein the first preset threshold is less than the second preset threshold;

otherwise, determine that the first correction weight is in a positive correlation relationship with the preset second correction parameter.

16. The device according to claim 15, wherein the positive correlation relationship is a linear relationship.

* * * * *